United States Patent [19]

Germanas et al.

[11] 3,892,683

[45] July 1, 1975

[54] HYDROCARBON ISOMERIZATION CATALYST

[75] Inventors: Dalia Germanas, Des Plaines; Ernest L. Pollitzer, Skokie, both of Ill.

[73] Assignee: Universal Oil Products Company, Des Plaines, Ill.

[22] Filed: May 17, 1974

[21] Appl. No.: 471,070

Related U.S. Application Data

[63] Continuation-in-part of Ser. No. 293,232, Sept. 28, 1972, abandoned.

[52] U.S. Cl. ............ 252/442; 252/441; 260/683.75; 260/683.68
[51] Int. Cl. ............................................. B01j 11/78
[58] Field of Search ............................ 252/441, 442

[56] References Cited
UNITED STATES PATENTS

| | | | |
|---|---|---|---|
| 3,366,705 | 1/1968 | Giannetti et al. | 252/441 X |
| 3,449,264 | 6/1969 | Myers | 252/441 |
| 3,553,281 | 1/1971 | Goble et al. | 252/441 X |
| 3,632,525 | 1/1972 | Rausch | 252/442 |

*Primary Examiner*—Patrick P. Garvin
*Attorney, Agent, or Firm*—James R. Hoatson, Jr.; Robert W. Welch; William H. Page, II

[57] ABSTRACT

A hydrocarbon conversion catalyst comprising a platinum group component and a tin component composited with alumina, the composite having been treated with aluminum chloride and with carbon tetrachloride to produce an improved low temperature isomerization catalyst.

11 Claims, No Drawings

HYDROCARBON ISOMERIZATION CATALYST

RELATED APPLICATION

This is a continuation-in-part of a copending application Ser. No. 293,232, filed Sept. 28, 1972, now abandoned.

The present invention relates to a novel hydrocarbon conversion catalyst useful to convert relatively straight chain hydrocarbons to more highly branched chain isomers thereof. The catalyst composition of this invention is particularly effective for low temperature isomerization of gasoline boiling range $C_4+$ paraffin hydrocarbons, especially n-pentane and/or n-hexane.

The novel catalyst composition of this invention, in one of its broad aspects, consists essentially of a composite of from about 0.01 to about 2.0 wt. % of a platinum group metal and from about 0.01 to about 5.0 wt. % tin with a refractory inorganic oxide reacted with a Friedel Crafts metal halide in an amount to introduce at least 3.5 wt. % combined halogen to the composite, said composite having been treated at a temperature of from about 150° to about 350° C. with a polyhalo compound containing at least two chlorine atoms and selected from the group consisting of methylene halide, haloform, methylhaloform, carbon tetrahalide, sulfur dihalide, sulfuryl halide, thionyl halide, and thiocarbonyl tetrahalide to add at least about 0.1% combined halogen to the composite.

One of the more specific embodiments of the present invention relates to a catalyst composition consisting essentially of from about 0.01 to about 2.0 wt. % platinum and from about 0.01 to about 5.0 wt. % tin composited with alumina, the composite having been reduced and treated first in contact with aluminum chloride vaporized and sublimed thereon in a hydrogen atmosphere, unreacted aluminum chloride being flushed therefrom with hydrogen at a temperature of from about 400° to about 600° C. with the formation of a composite containing from about 3.5 to about 10 wt. % combined chlorine, and thereafter in contact with carbon tetrachloride in a non-reducing atmosphere at a temperature of from about 150° to about 350° C. with the addition of at least about 0.1 wt. % combined chlorine thereto.

The refractory inorganic oxide utilized herein as a support or carrier material includes alumina, silica, zirconia, boria, thoria, magnesia, titania, chromia, etc., and composites of two or more of said refractory inorganic oxides such as alumina-silica, alumina-zirconia, alumina-chromia, and the like, and also composites of one or more of said refractory inorganic oxides with one or more crystalline aluminosilicates, for example, naturally occurring or synthetically prepared faujasite and/or mordenite in the hydrogen and/or multi-valent cation exchanged form. Preferably, the refractory inorganic oxide carrier material is alumina. The alumina may be any of the various hydrous aluminum oxides or aluminum gels such as boehmite, gibbsite, bayerite, and the like. Activated aluminas, such as have been thermally treated at a temperature in excess of about 400° C. with the elimination of at least a portion of the chemically and/or physically combined water and hydroxyl groups commonly associated therewith, are particularly suitable. Preferably, the alumina is an activated alumina characterized by a surface area of from about 100 to about 500 m²/gm, especially gamma- and eta-alumina prepared by thermal treatment at a temperature generally in the range of from about 400° to 850° C.

The alumina component, which also serves as a carrier or support for the other catalyst components, is advantageously employed substantially free of sodium, say less than about 0.5 wt. %. The alumina will typically be utilized in a shape or form determinative of the shape or form of the final catalyst product, e.g., spheres, pills, granules, extrudates, powder, etc. The catalyst of this invention is preferably, although not necessarily, utilized in the form of spheroidal particles, and spheroidal alumina particles are conveniently and advantageously prepared sodium-free by the well-known oil drop method as described in U.S. Pat. No. 2,620,314. Briefly, an alumina sol, such as results from digesting aluminum in hydrochloric acid under controlled conditions, is dispersed as droplets in a hot oil bath whereby gelation occurs with the formation of spheroidal gel particles. In this type of operation, the alumina is set chemically utilizing ammonia as a neutralizing or setting agent. Usually, the ammonia is furnished by an ammonia precursor such as hexamethylenetetramine which is included in the sol. Only a fraction of the ammonia precursor is hydrolyzed or decomposed to ammonia in the relatively short period during which the initial gelation occurs. During the subsequent aging process, the residual ammonia precursor retained in the gel particles continues to hydrolyze and effect further polymerization of the alumina whereby desirable pore characteristics are established. After a suitable aging period, usually from about 10 to about 24 hours at a temperature in the 50°–105° C. range, the alumina spheres are washed, dried, and calcined or activated at a temperature of from about 400° to about 850° C.

The tin and platinum group catalytic components may be composited with the alumina support or carrier material in any conventional or otherwise convenient manner. Suitable methods include impregnation and/or ion exchange of the alumina with a suitable platinum group metal compound and a suitable compound of tin utilizing separate impregnating and/or ion exchange solutions, or preferably a common solution thereof. Suitable methods further include coprecipitation or cogelation of the tin component with the alumina, and subsequent impregnation and/or ion exchange of the resulting composite with a suitable platinum group metal compound. In the latter case, a soluble tin compound, such as stannous or stannic chloride, may be admixed with the aforementioned alumina sol prior to dispersing the same as droplets in the hot oil bath. Following calcination, an alumina support or carrier material is obtained comprising stannic oxide in intimate combination therewith.

Although this invention is directed to a catalyst containing a platinum group metal, i.e., platinum, palladium, rhodium, ruthenium, osmium and iridium, platinum is a preferred catalyst component. The platinum group component is suitably composited with the alumina, or with the tin-containing alumina, utilizing impregnating techniques known to the art. For example, the alumina particles can be suspended, dipped, soaked or otherwise immersed in an aqueous solution of a soluble platinum group metal compound. Suitable compounds include platinum chloride, chloroplatinic acid, ammonium chloroplatinate, dinitrodiamino platinum, palladium chloride, chloropalladic acid, and the like. It is common practice to impregnate the alumina with an aqueous chloroplatinic acid solution acidified with hydrochloric acid to facilitate an even distribution of platinum on the alumina, and the resulting composite will in this and similar cases invariably contain combined halogen, although the combined halogen will generally be less than about 1.5 wt. % of the composite.

When the tin component is incorporated in the catalyst composite by impregnation and/or ion exchange techniques, a soluble tin compound, suitably stannous or stannic chloride, is conveniently and advantageously prepared in common solution with the platinum group metal compound, and the tin component and platinum group component simultaneously incorporated in the catalyst composite. In this instance, a preferred impregnating solution comprises chloroplatinic acid, hydrochloric acid, and stannous or stannic chloride.

In any case, the carrier material is preferably maintained in contact with the impregnating solution at ambient temperature conditions for a brief period, suitably at least about 30 minutes, and the solution thereafter evaporated substantially to dryness. For example, a volume of alumina particles is immersed in a substantially equal volume of impregnating solution in a steam-jacketed rotary dryer and tumbled therein for a brief period at room temperature. Steam is thereafter applied to the dryer jacket to expedite evaporation of the solution and recovery of substantially dry impregnated alumina particles.

The dried composite will generally be calcined at a temperature of from about 375° to about 595° C. in an air atmosphere to convert the tin and platinum group metal substantially to the oxide form. In a preferred embodiment of this invention, the tin-platinum group metal-alumina composite utilized as a starting material is prepared in a reduced form. Suitably, the composite is treated in a substantially water-free hydrogen atmosphere at a temperature of from about 425° to about 650° C. to insure a uniform and finely divided dispersion of the metal components on the alumina.

In accordance with the present invention, the reduced composite containing a tin component and a platinum component in combination with alumina, is treated in contact with a Friedel Crafts metal halide at conditions to react said metal halide with said alumina with the formation of a composite containing at least about 3.5 wt. % combined halogen. The Friedel Crafts metal halide treatment is suitably in accordance with prior art practice whereby a Friedel Crafts metal halide is vaporized and sublimed on the reduced composite. The process is facilitated by contacting the reduced composite with Friedel Crafts metal halide vapors diluted with an inert gas, preferably a reducing gas such as hydrogen. Reaction of the Friedel Crafts metal halide with the alumina will occur, at least to some extent, during the vaporization and sublimation process. However, it is a preferred practice to flush unreacted metal halide from the composite with hydrogen at a temperature somewhat in excess of the metal halide vaporization temperature, generally at a temperature in the 300°–600° C. range depending on the Friedel Crafts metal halide employed, and the subsequent heat treatment serves to further the reaction while effecting vaporization and separation of unreacted Friedel Crafts metal halide, the final catalyst composite being substantially free thereof.

Various Friedel Crafts metal halides can be employed although not necessarily with an equivalent degree of improvement in the catalyst product. The Friedel Crafts metal halide is preferably a Friedel Crafts metal chloride, for example aluminum chloride, antimony pentachloride, beryllium chloride, ferric chloride, gallium tetrachloride, stannic chloride, titanium tetrachloride, zinc chloride, zirconium chloride, and the like. In a preferred embodiment, the Friedel Crafts metal halide is aluminum chloride. Aluminum chloride sublimes at 178° C., and vaporization is suitably effected at a temperature of from about 180° C. to about 550° C. The amount of aluminum chloride which sublime, onto the composite reaches a maximum at any given temperature in excess of about 178° C. As heretofore indicated, reaction of the aluminum chloride with the alumina will occur, at least to some extent, during the vaporization and sublimation process, and hydrogen chloride is evolved. Subsequent heat treatment at a temperature in excess of the sublimation temperature and generally not exceeding about 600° C. serves to further the reaction while vaporizing unreacted aluminum chloride for separation from the composite. When, as is preferably the case, the Friedel Crafts metal halide treatment precedes the polyhalo compound treatment, the catalyst composite will contain from about 3.5 to about 10 wt. % combined halogen at this stage, probably although not necessarily in the form of an oxyaluminum chloride, and be substantially free of unreacted Friedel Crafts metal halide.

Pursuant to the present invention, the reduced composite comprising tin, a platinum group component and alumina is treated in contact with a polyhalo compound at conditions to add at least about 0.1 wt. % combined halogen to the composite, the polyhalo compound containing at least two chlorine atoms and being selected from the group consisting of methylene halide, haloform, methylhaloform, carbon tetrahalide, sulfur dihalide, sulfuryl halide, thionyl halide, and thiocarbonyl tetrahalide. Suitable polyhalo compounds thus include methylene chloride, chloroform, methylchloroform, carbon tetrachloride, sulfur dichloride, sulfuryl chloride, thionyl chloride, thiocarbonyl tetrachloride, and the like. In any case, the polyhalo compound must contain at least two chlorine atoms attached to the same carbon or sulfur atom. The reduced composite may be treated in contact with the polyhalo compound per se, but preferably the polyhalo compound is utilized diluted with a non-reducing gas, for example nitrogen, air, oxygen, and the like. The reduced composite is suitably treated at a temperature of from about 100° to about 600° C. in contact with the polyhalo compound over a period of from about 0.2 to about 5 hours to add at least 0.1 wt. % combined halogen thereto. Of the polyhalo compounds, carbon tetrachloride is preferred.

The catalyst composition of this invention is useful to effect a variety of hydrocarbon conversion reactions involving conditions comprising temperatures in the 25°–760° C. range. For example, the catalysts are useful in effecting the hydrocracking of a kerosine fraction to form lower boiling, more useful petroleum products utilizing a temperature of from about 260° to about 760° C. and pressures from about 500 to about 1,000 psig. The catalyst composition of this invention is particularly useful to effect isomerization of isomerizable paraffinic hydrocarbons including n-butane, n-pentane, n-hexane, n-heptane, n-octane or mixtures thereof, and also the isomerization of slightly branched chain saturated hydrocarbons to more highly branched chain saturated hydrocarbons such as the isomerization of 2- or 3-methylpentane to 2,2- and 2,3-dimethylbutane, and also the isomerization of naphthenes, for example the isomerization of dimethylcyclopentane to methylcyclohexane, methylcyclopentane to cyclohexane, and the like, at isomerization reaction conditions. The catalyst is especially advantageous to effect low temperature isomerization of straight chain hydrocarbons containing 4 to 6 carbon atoms. Isomerization of isomerizable paraffinic hydrocarbons as herein contemplated is effected at a relatively low temperature in the range of from about 65° to about 235° C. The hydrocarbon feed stock is treated in admixture with hydrogen utilizing a hydrogen-hydrocarbon mole ratio of from about 0.25:1 to about 20:1 at a pressure ranging from atmospheric to about 2,000 psig. In a continuous type of operation, liquid hourly space velocities of from about 0.5 to about 10 are suitably employed.

A preferred embodiment of the present invention relates to a catalyst composition comprising from about 0.01 to about 2.0 wt. % platinum and from about 0.01 to about 5.0 wt. % tin composited with alumina, the composite having been reduced and treated (a) in contact with aluminum chloride vaporized and sublimed thereon in a hydrogen atmosphere with the formation of a composite containing from about 3.5 to about 10 wt. % combined chlorine, unreacted aluminum chloride being flushed therefrom with hydrogen at a temperature of from about 400° to about 600° C., and (b) in contact with carbon tetrachloride in a nonreducing atmosphere at a temperature of from about 150° to about 350° C. with the addition of at least about 0.1 wt. % combined chlorine thereto.

The following examples are presented in illustration of the improved catalyst composition of this invention and are not intended as and undue limitation on the generally broad scope of the invention as set out in the appended claims.

EXAMPLE I

Gamma-alumina spheres of about 1/16 inch diameter and containing 0.3 wt. % combined chlorine were impregnated with 0.6 wt. % platinum from an aqueous solution of chloroplatinic acid and hydrochloric acid. Impregnation was effected by immersing the spheres in the solution and evaporating the solution to dryness utilizing a steam-jacketed rotary dryer. The dried spheres were subsequently calcined at 500°–550° C., first in air for about 2 hours and then in hydrogen for 1 hour. About 50 grams of anhydrous aluminum chloride was then vaporized, commingled with hydrogen, and passed in contact with about 125 grams of the reduced platinum containing spheres over a period of 1.5 hours at 550° C. The spheres were then purged or flushed with hydrogen for about 1 hour at 600° C. to remove unreacted aluminum chloride. The catalyst, containing 5.33 wt. % combined chlorine, is hereinafter referred to as Catalyst A.

EXAMPLE II

A catalyst was prepared substantially as described in Example I except that a tin component was included with the platinum component. Thus, the alumina spheres were impregnated with 0.6 wt. % platinum and 0.5 wt. % tin from an aqueous solution of chloroplatinic acid, hydrochloric acid and stannic chloride. Impregnation was again effected by immersing the spheres in the solution and evaporating the solution to dryness utilizing a steam-jacketed rotary dryer. The dried spheres were then calcined at 500°–550° C. first in air for about 2 hours and then in hydrogen for 1 hour. About 50 grams of anhydrous aluminum chloride was then vaporized, commingled with hydrogen, and passed in contact with about 125 grams of the reduced platinum-tin containing spheres over a period of 1.5 hours at 550° C. The spheres were then flushed with hydrogen for about 1 hour at 600° C. for the removal of unreacted aluminum chloride. The catalyst contained 5.85 wt. % combined chlorine, and is hereinafter referred to as Catalyst B.

EXAMPLE III

A catalyst was prepared substantially as described in Example II, but further incorporating the carbon tetrachloride treatment in accordance with the present invention. Thus, about 60 grams of carbon tetrachloride, diluted with nitrogen, was passed in contact with the aluminum chloride treated, platinum-tin containing spheres of Example II over a period of about 1.5 hours at a temperature of 275° C. Unreacted carbon tetrachloride was then flushed from the spheres with nitrogen at 300° C. for a period of about 1.5 hours to yield a catalyst composition containing 6.35 wt. % combined chlorine. The catalyst composition is hereinafter referred to as Catalyst C.

EXAMPLE IV

A catalyst was prepared substantially as described in Example I, the catalyst being in this case further treated with carbon tetrachloride. Thus, about 60 grams of carbon tetrachloride, diluted with nitrogen, was passed in contact with the aluminum chloride treated platinum containing spheres over a period of about 1.5 hours at 275° C. Thereafter, unreacted carbon tetrachloride was flushed from the spheres with nitrogen at 300° C. for 1.5 hours to yield a catalyst composition containing 6.02 wt. % combined chlorine, and hereinafter referred to as Catalyst D.

EXAMPLE V

In this example, the aluminum chloride treatment was omitted, and the catalyst was subjected only to the carbon tetrachloride treatment. In the preparation of the catalyst, the alumina spheres were impregnated with 0.6 wt. % platinum and 0.5 wt. % tin as heretofore described. The impregnated spheres were calcined at 500°–550° C., first in air for about 2 hours and thereafter in hydrogen for about 1 hour. About 60 grams of carbon tetrachloride, diluted with nitrogen, was then passed over the catalyst for about 1.5 hours at 275° C., with unreacted carbon tetrachloride being thereafter flushed from the catalyst with nitrogen at 300° C. The catalyst composition, hereinafter referred to as Catalyst E, contained about 6.78 wt. % combined chlorine.

The catalysts of the preceding examples were evaluated with respect to the isomerization of n-pentane and n-hexane to branched chain, octane improving isomers thereof. The catalysts were in each case evaluated utilizing a feed stock comprising 50 mole % n-pentane and 50 mole % n-hexane admixed with hydrogen to provide a hydrocarbon/hydrogen mole ratio of about 8. The feed stock was continuously passed in contact with the catalyst at a liquid hourly space velocity of about 2 in a once-through type of operation. The reactor temperature was maintained at 120° C. and the pressure at 1,000 psig. The results are tabulated below.

| Catalyst | A | B | C | D | E |
|---|---|---|---|---|---|
| Wt. % Pt | 0.6 | 0.6 | 0.6 | 0.6 | 0.6 |
| Wt. % Sn | — | 0.5 | 0.5 | — | 0.5 |
| Treatment | | | | | |
| $AlCl_3$ | Yes | Yes | Yes | Yes | No |
| $CCl_4$ | No | No | Yes | Yes | Yes |
| Isomerization Activity | | | | | |
| % iso-pentane/Σ $C_5$ paraffins | 42.6 | 18.3 | 71.3 | 62.2 | 44.2 |
| % of equilibrium | 55.3 | 23.8 | 92.6 | 80.8 | 57.4 |
| % 2,2-dimethylbutane/Σ $C_6$ paraffin | 19.3 | 5.1 | 36.7 | 31.1 | 20.6 |
| % of equilibrium | 45.3 | 12.0 | 86.2 | 73.0 | 48.4 |

The tabulated data demonstrates the improvement resulting from the inclusion of a tin component provided that the catalyst is subjected to both the aluminum chloride treatment and the carbon tetrachloride treatment. For example, when Catalyst A, containing a platinum component and treated with aluminum chloride, is compared with Catalyst B, which is substantially the same catalyst but further containing a tin component, it is evident that the addition of a tin component is not necessarily advantageous and in fact can be detrimental unless the catalyst is further treated with carbon tetrachloride as illustrated by Catalyst C. That the tin component does afford a substantial improvement in this last instance is shown by a comparison of the data relating to Catalysts C and D, the latter having been prepared without the tin component. And the data relating to Catalyst E, which has been subjected only to the carbon tetrachloride treatment, when taken together with the data relating to Catalyst C, further emphasizes the importance of the aluminum chloride treatment in combination with the carbon tetrachloride treatment.

We claim as our invention:

1. A catalyst composition consisting essentially of a composite of from about 0.01 to about 2.0 wt. % of platinum group metal and from about 0.01 to about 5.0 wt. % of tin with a refractory inorganic oxide reacted with a Friedel Crafts metal halide in an amount to introduce at least 3.5 wt. % combined halogen to the composite, said composite having been treated at a temperature of from about 150° to about 350° C. with a polyhalo compound containing at least two chlorine atoms and selected from the group consisting of methylene halide, haloform, methylhaloform, carbon tetrahalide, sulfur dihalide, sulfuryl halide, thionyl halide, and thiocarbonyl tetrahalide to add at least about 0.1% combined halogen to the composite.

2. The catalyst composition of claim 1 further characterized in that said refractory inorganic oxide is alumina.

3. The catalyst composition of claim 1 further characterized in that said refractory inorganic oxide is gamma-alumina.

4. The catalyst composition of claim 1 further characterized in that said refractory inorganic oxide is eta-alumina.

5. The catalyst composition of claim 1 further characterized in that said platinum group metal is platinum.

6. The catalyst composition of claim 1 further characterized in that said Friedel Craft metal halide is aluminum chloride.

7. The catalyst composition of claim 1 further characterized in that said Friedel Crafts metal halide is in an amount to form a composite containing from about 3.5 to about 10 wt. % combined halogen.

8. The catalyst composition of claim 1 further characterized in that said Friedel Crafts metal halide is vaporized and sublimed on said reduced composite.

9. The catalyst composition of claim 1 further characterized in that said polyhalo compound is carbon tetrachloride.

10. The catalyst composition of claim 1 further characterized in that said polyhalo compound treatment is in a non-reducing atmosphere.

11. The catalyst composition consisting essentially of from about 0.01 to about 2.0 wt. % platinum and from about 0.01 to about 5.0 wt. % tin composited with alumina, the composite having been reduced and treated first in contact with aluminum chloride vaporized and sublimed thereon in a hydrogen atmosphere, unreacted aluminum chloride being flushed therefrom with hydrogen at a temperature of from about 400° to about 600° C. with the formation of a composite containing from about 3.5 to about 10 wt. % combined chlorine, and thereafter in contact with carbon tetrachloride in a non-reducing atmosphere at a temperature of from about 150° to about 350° C. with the addition of at least about 0.1 wt. % combined chlorine thereto.

* * * * *